United States Patent
Burns et al.

Patent Number: 6,095,939
Date of Patent: Aug. 1, 2000

[54] DIFFERENTIAL FOR VEHICULAR POWER TRANSFER SYSTEMS

[75] Inventors: Timothy M. Burns, Jordan; Sankar K. Mohan, Syracuse, both of N.Y.

[73] Assignee: New Venture Gear, Inc., Troy, Mich.

[21] Appl. No.: 09/208,062

[22] Filed: Dec. 9, 1998

Related U.S. Application Data

[60] Provisional application No. 60/070,086, Dec. 31, 1997.

[51] Int. Cl.[7] ............................................. F16H 48/22
[52] U.S. Cl. ............................ 475/88; 475/86; 475/92
[58] Field of Search ......................... 475/86, 87, 88, 475/90, 92

[56] References Cited

U.S. PATENT DOCUMENTS

| | | | |
|---|---|---|---|
| 5,148,900 | 9/1992 | Mohan | 192/58 C |
| 5,310,388 | 5/1994 | Okcuoglu et al. | 475/88 C |
| 5,323,871 | 6/1994 | Wilson et al. | 180/247 |
| 5,358,454 | 10/1994 | Bowen et al. | 475/91 X |
| 5,536,215 | 7/1996 | Shaffer et al. | 475/88 |
| 5,595,214 | 1/1997 | Shaffer et al. | 475/88 X |
| 5,611,746 | 3/1997 | Shaffer | 475/88 |
| 5,649,459 | 7/1997 | Murakami et al. | 74/665 GE |
| 5,655,983 | 8/1997 | Dick | 475/88 |
| 5,702,319 | 12/1997 | Baxter, Jr. | 475/88 |
| 5,704,863 | 1/1998 | Zalewski et al. | 475/88 |
| 5,738,604 | 4/1998 | Dick | 475/206 |
| 5,779,013 | 7/1998 | Bansbach | 192/21.5 |
| 5,827,145 | 10/1998 | Okcuoglu | 475/88 |

*Primary Examiner*—Khoi Q. Ta
*Attorney, Agent, or Firm*—Harness, Dickey & Pierce, P.L.C.

[57] ABSTRACT

A differential assembly is disclosed having a pair of hydraulic couplings installed in a differential casing and operably arranged to rotatively couple first and second rotary members to the differential casing. Each hydraulic coupling includes a clutch pack operatively connected between one of the rotary members and the casing, a hydraulic pump, and a fluid distribution system for delivering pumped fluid to a pressure chamber to actuate a piston for engaging the clutch pack and to a clutch chamber to cool the clutch pack.

10 Claims, 4 Drawing Sheets

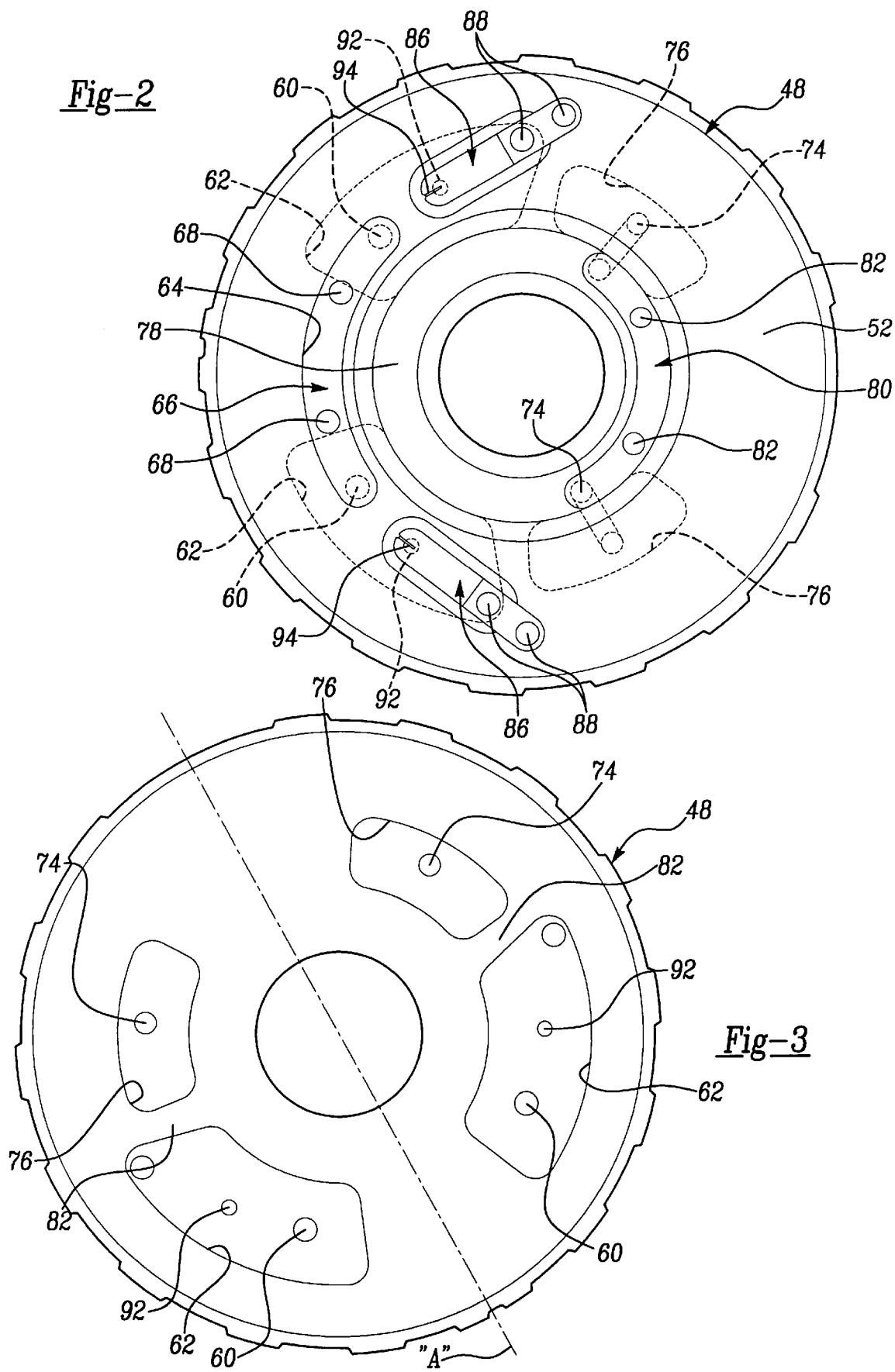

DIFFERENTIAL FOR VEHICULAR POWER TRANSFER SYSTEMS

Priority under 35 USC 119(e) is hereby claimed on provisional application No. 60/070,086 filed Dec. 31, 1997.

BACKGROUND OF THE INVENTION

The present invention relates generally to hydromechanical limited slip couplings of the type used in motor vehicle driveline applications. In particular, the present invention is directed to a differential assembly having a pair of hydraulic couplings, each having a hydraulic pump, a transfer clutch, and a fluid distribution system for distributing fluid from the pump to a first chamber for actuating the transfer clutch and to a second chamber for lubricating and cooling the transfer clutch.

Hydraulic couplings are used in various vehicular drivetrain applications to limit slip and transfer drive torque between a pair of rotary members. In all-wheel drive applications, hydraulic couplings are used to automatically control the drive torque transferred from a driven member to a non-driven member in response to speed differentiation therebetween. In limited slip applications, couplings are used in association with a differential to automatically limit slip and bias the torque distribution between a pair of rotary members. Examples of hydraulic couplings which are adaptable for such driveline applications include viscous couplings, geared traction units, and electronically-controlled friction clutches generally similar to those shown and described in commonly-owned U.S. Pat. Nos. 4,650,028, 5,148,900; 5,358,454; 5,323,871; 5,649,459; 5,704,863 and 5,779,013.

While known hydraulic couplings, including but not limited to those discussed above, have proven to be acceptable for various vehicular driveline applications, such devices are nevertheless susceptible to improvements that may enhance their performance and cost. With this in mind, a need exists to develop improved hydraulic couplings and driveline apparatuses which advance the art.

SUMMARY OF THE INVENTION

Accordingly, it is an object of the present invention to provide a differential assembly for use in motor vehicle driveline applications to limit slip and transfer torque between a pair of rotary members.

In accordance with this object, the differential assembly of the present invention includes a pair of hydraulic coupling installed in a differential casing and operably arranged for progressively coupling first and second rotary members. Each hydraulic coupling includes a transfer clutch operatively connected between one of the rotary members and the differential casing, a hydraulic pump, and a fluid path for providing fluid flow from the hydraulic pump to a fluid-actuated device for controlling actuation of the transfer clutch.

It is a more specific object of the present invention to provide each hydraulic coupling of the differential assembly with a fluid path capable of delivering pumped fluid to a piston chamber for actuating the transfer clutch and to a clutch chamber for lubricating and cooling the transfer clutch.

According to one arrangement, the differential assembly is installed in a driveline apparatus with the supply chamber for both hydraulic couplings in fluid communication with a sump associated with the driveline apparatus. Alternatively, the differential assembly can be a sealed unit installed within a driveline apparatus and includes a recirculatory fluid path capable of supplying pumped fluid from an internal reservoir to the piston chamber and the clutch chamber of each hydraulic coupling.

The present invention provides a differential assembly for use in motor vehicles. The differential assembly includes a differential casing and first and second shafts rotatably supported by the casing. The differential assembly further includes a first hydraulic coupling installed between the first shaft and the differential casing, and a second hydraulic coupling installed between the second shaft and the differential casing. Both of the first and second hydraulic couplings include a transfer clutch and a hydraulic pump. Each transfer clutch includes a clutch pack located within a clutch chamber formed in the differential casing and having a first clutch plate fixed for rotation with one of the first and second shafts and a second clutch plate fixed for rotation with the differential casing. The transfer clutch further includes a piston housing fixed for rotation with the differential casing and defining a piston chamber, and a piston retained for sliding movement in the piston chamber to exert a clutch engagement force on the clutch pack. The piston housing further defines a split fluid path including a first pathway in fluid communication with the piston chamber and a second pathway in fluid communication with the clutch chamber. The magnitude of the clutch engagement force exerted by the piston on the clutch pack is a function of the fluid pressure in the piston chamber. Each hydraulic pump includes a first member coupled for rotation with one of the first and second shafts and a second member coupled for rotation with the differential casing. The hydraulic pump is operative for delivering fluid under pressure to the piston chamber through the first pathway and to the clutch chamber through the second pathway in response to a speed differential between the shafts and the differential casing.

BRIEF DESCRIPTION OF THE DRAWINGS

Further objects, features and advantages of the present invention will become readily apparent from the following detailed specification and the appended claims which, in conjunction with drawings, set forth the best mode now contemplated for carrying out the invention. Referring to the drawings:

FIG. 2 is a side view of the piston housing associated with the hydraulic couplings shown in FIG. 1;

FIG. 3 is the opposite side view of the piston housing shown ion FIG. 2;

DETAILED DESCRIPTION OF THE INVENTION

In general, the present invention is directed to a hydromechanical limited slip and torque transfer device, hereinafter referred to as a differential assembly. Driveline applications contemplated for the differential assembly of the present invention include, but are not limited to, limited slip axle differentials for all-wheel drive vehicles and limited slip differentials for transfer cases, transaxles and the like. Furthermore, this invention solves a problem inherent to hydraulic couplings by incorporating a fluid distribution arrangement and control valving which permits hydraulic fluid to be pumped from a supply chamber for actuating the clutch pack and cooling the clutch pack.

Figure 1:
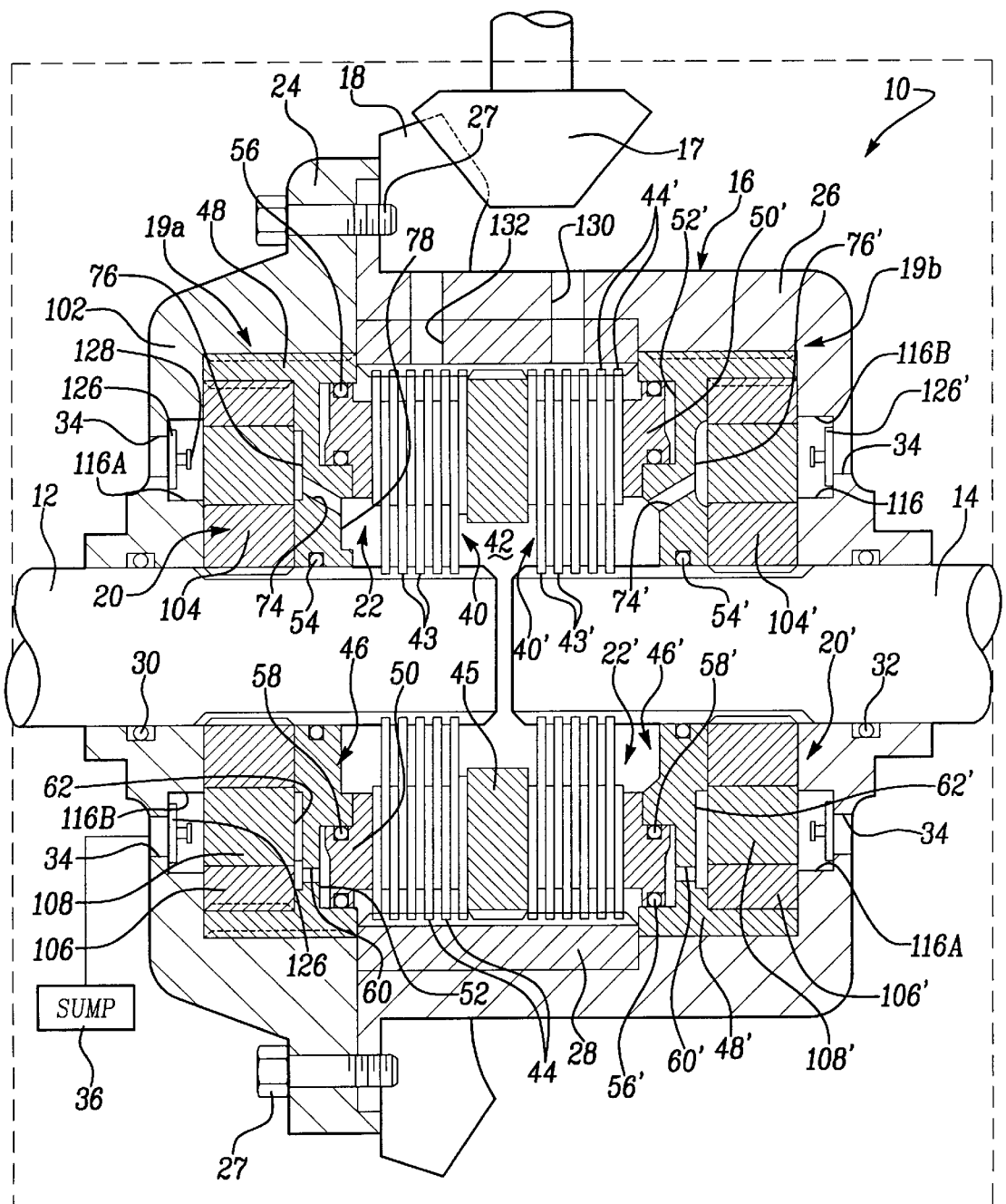
FIG. 1 is a sectional view of a differential assembly having hydraulic couplings operably installed between a rotary member and a differential casing.
Figure 4:
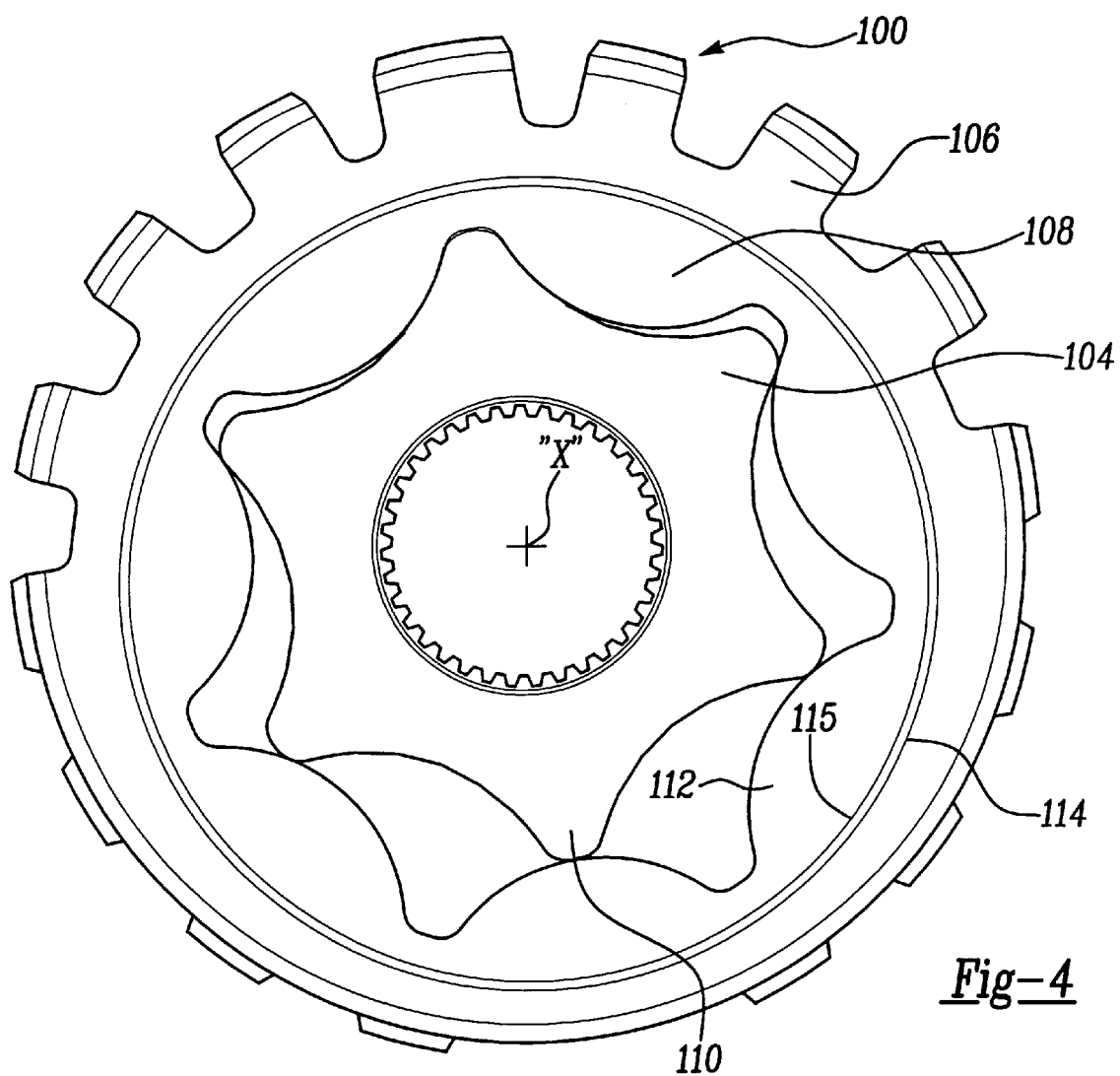
FIG. 4 is a side view showing the components of the hydraulic pump associated with the hydraulic couplings shown in FIG. 1.

Referring initially to FIG. 1, a differential assembly according to the present invention is generally identified with reference numeral 10. Differential assembly 10 is installed in a driveline apparatus 11 and is operatively coupled between a first rotary member and a second rotary member for limiting speed differentiation and transferring rotary power (i.e., drive torque) therebetween. In the embodiment shown, first rotary member is a first axle shaft 12 and second rotary member is a second axle shaft 14. Differential assembly 10 includes a differential casing 16 rotatably driven by a pinion gear 17 through a ring gear 18 that is fixed to differential casing 16. While not shown, pinion gear 17 is driven by the output of a transfer case or a power take-off of a transaxle for delivering drive torque to casing 16 of differential assembly 10.

Differential assembly 10 is illustrated to include a first hydraulic coupling 19a operatively connected between differential casing 16 and first shaft 12, and a second hydraulic coupling 19b operatively connected between differential casing 16 and second shaft 14. First and second hydraulic couplings 19a and 19b are substantially identical. As such, the remainder of this detailed description will be primarily directed to the construction and operation of first hydraulic coupling 19a. However, components common between first and second hydraulic couplings 19a and 19b are identified with primed reference numbers in the drawings.

In general, hydraulic coupling 19a includes a hydraulic pump 20 and a transfer clutch 22 that are operably arranged within differential casing 16. As shown, hydraulic pump 20 is a bi-directional gerotor pump and transfer clutch 22 is a hydraulically-actuated multi-plate clutch assembly. Differential casing 16 includes a pair of case segments 24 and 26 which are suitably interconnected, such as by bolts 27, to define an internal chamber. A cylindrical drum 28 is shown secured (i.e., splined) within the internal chamber for rotation with case segment 26. An O-ring seal 30 permits case segment 24 to rotate relative to first shaft 12 while providing a fluid-tight seal therebetween. Similarly, an O-ring seal 32 supports and seals case segment 26 relative to second shaft 14. Inlets 34 are formed in each of case segments 24 and 26 for permitting hydraulic fluid to be drawn from a sump, schematically shown by block 36, in driveline apparatus 11 into the internal chamber defined within casing 16.

With continued reference to FIG. 1, transfer clutch 22 is shown to include an interleaved clutch pack 40 disposed within a clutch chamber or gallery 42. Clutch pack 40 includes a plurality of inner clutch plates 43 fixed (i.e., splined) for rotation with first shaft 12 and which are alternately interleaved with a plurality of outer clutch plates 44 fixed (i.e., splined) for rotation with drum 28. Similarly, clutch pack 40' associated with transfer clutch 22' is also disposed in clutch chamber 42 and includes inner clutch plates 43' fixed for rotation with second shaft 14 and which are interleaved with outer clutch plates 44' fixed for rotation with drum 28. An axially "floating" reaction plate 45 is fixed (i.e., splined) to drum 28 and separates clutch pack 40 of hydraulic coupling 19a from clutch pack 40' of hydraulic coupling 19b. Transfer clutch 22 further includes a piston assembly 46 comprised of a piston housing 48 that is fixed (i.e., splined) at its outer periphery to case segment 24, and a piston 50 retained for sliding movement in an annular pressure or piston chamber 52 formed in piston housing 48. As shown, an O-ring seal 54 permits piston housing 48 to rotate relative to first shaft 12 while providing a fluid-tight seal therebetween. In addition, O-ring seals 56 and 58 are disposed between the mating edge surfaces of piston chamber 52 and piston 50. Similarly, piston housing 48' of transfer clutch 22' is fixed (i.e., splined) at its outer periphery to case segment 26 and is sealed at its inner periphery relative to second shaft 14 by an O-ring seal 54'.

Piston 50 is supported for axial sliding movement within piston chamber 52 for applying a compressive clutch engagement force on clutch pack 40, thereby transferring drive torque from differential casing 16 to first shaft 12. The amount of torque transfer (i.e., the torque ratio or split) is progressive and continuously variable and is proportional to the magnitude of the clutch engagement force exerted by piston 50 on clutch pack 40 which, in turn, is a function of the fluid pressure within piston chamber 52. Moreover, the magnitude of the fluid pressure within piston chamber 52, as delivered thereto by hydraulic pump 20, is largely a function of the speed differential between shafts 12 and 14 and/or between shaft 12 and differential casing 16. In addition, the clutch engagement force exerted on reaction plate 45 by clutch pack 40 causes reaction plate 45 to exert a corresponding clutch engagement force on clutch pack 40' for actuating transfer clutch 22'.

With particular reference now to FIGS. 1 through 3, piston housing 48 is shown to have a fluid distribution and valving arrangement that is operable for selectively controlling the delivery of fluid to piston chamber 52 and clutch chamber 42. In particular, piston housing 48 includes a pair of first transfer ports 60 each extending between and communicating with one of a pair of first shadow slots 62 and a piston inlet slot 64 formed in piston chamber 52. In addition, a check valve 66 is mounted by rivets 68 in piston inlet slot 64. Preferably, check valve 66 is an elongated metallic reed valve element. Based on the direction of relative rotation between first shaft 12 and differential casing 16 (which results in a corresponding directional rotation of hydraulic pump 20), the hydraulic pressure in one of first shadow slots 62 generated by the pumping action of hydraulic pump 20 causes the corresponding terminal end of reed-type check valve 66 to resiliently deflect to an "open" position away from inlet slot 64 in piston housing 48, thereby opening its corresponding first transfer port 60 to permit fluid to flow from the particular first shadow slot 62 into piston chamber 52. Concurrently, the lower fluid pressure in the other of first shadow slots 62 is unable to move the other terminal end of check valve 66 which is maintained in a "closed" position within inlet slot 64 for inhibiting the discharge of hydraulic fluid from piston chamber 52 through the other of first transfer ports 60. As such, the hydraulic fluid in piston chamber 52, if it exceeds a predetermined minimum pressure, will actuate transfer clutch 22 by moving piston 50 toward clutch pack 40 for applying the resultant clutch engagement force thereon. During the opposite direction of relative rotation between first shaft 12 and differential casing 16, the open and closed positions mentioned above are reversed for each of first transfer ports 60. Upon cessation of the pumping action, each terminal end of check valve 66 is biased to return to its respective closed position for maintaining a supply of fluid in piston chamber 52. Thus, check valve 66 functions as a normallyclosed valve. As will be appreciated, any other suitable one-way check valves could be used to control flow into piston chamber 52 from pump 20.

As seen from FIGS. 2 and 3, piston housing 48 also includes a pair of second transfer ports 74 each of which communicates with one of a pair of second shadow slots 76 and a discharge slot 78 in communication with clutch chamber 42. The valving arrangement associated with piston housing 48 further includes a check valve 80 mounted by rivets 82 in discharge slot 78. As is similar to check valve 66, check valve 80 is preferably an elongated metallic reed valve element. Based on the direction of relative rotation between first shaft 12 and differential casing 16, hydraulic pressure in one of second shadow slots 76 caused by the pumping action of pump 20 will cause the corresponding terminal end of reed-type check valve 80 to resiliently deflect to an "open" position away from discharge slot 78 in piston housing 48, thereby opening its corresponding second transfer port 74 to permit the flow of pumped hydraulic fluid into clutch chamber 42. Concurrently, the other terminal end of check valve 80 is maintained in a "closed" position relative to piston housing 48 for inhibiting the discharge of hydraulic fluid from clutch chamber 42 through the other of second transfer ports 74. Upon cessation of the pumping action, each terminal end of check valve 80 is biased to return to its respective closed position. Again, any suitable check valve can be used.

As best seen from FIG. 3, first shadow slots 62 and second shadow slots 76 are symmetrical about line "A". In addition, a web portion 82 separates each first shadow slot 62 from a corresponding one of second shadow slots 76. As such, fluid can be delivered from second shadow slots 76 through second transfer ports 74 to clutch chamber 42 without affecting the fluid pressure delivered through first transfer ports 60 to piston chamber 52. Thus, the pressurization characteristics for piston chamber 52 can be tuned for controlling actuation of piston 50 in a manner which is independent of the pumped fluid used to lubricate and cool clutch pack 40 in clutch chamber 42.

Hydraulic coupling 19a includes a control valve arrangement which is operable for setting the predetermined minimum pressure level within piston chamber 52 at which transfer clutch 22 is initially actuated and which is further operable to compensate for temperature gradients caused during heating of the hydraulic fluid. Preferably, a pair of control valves 86 are each secured by a rivet 88 such that its terminal end is normally maintained in an "open" position displaced from a bleed port 90 formed through piston housing 48 for permitting bleed flow from piston chamber 52. During low-speed relative rotation, the pumping action of hydraulic pump 20 causes fluid to be discharged from piston chamber 52 through one of bleed ports 90 into its corresponding first shadow slot 62 on the discharge side of hydraulic pump 20. Concurrently, the fluid discharged from piston chamber 52 through the other bleed port 90 is delivered to its corresponding first shadow slot 62 of the lower pressure suction side of pump 20. Alternatively, a bleed port can be formed through piston 50 with a control valve 86 controlling bleed flow into clutch chamber 42.

Control valves 86 are preferably bimetallic valve elements made of a laminated pair of dissimilar metallic strips having different thermal coefficients of expansion. As such, the terminal end of each control valve 86 moves relative to its corresponding bleed port 90 as its temperature is varied for controlling fluid flow through bleed ports 90 regardless of changes in the viscosity of hydraulic fluid caused by temperature changes. However, once the fluid in piston chamber 52 reaching its predetermined pressure level, the terminal end of control valve 86 on the suction side of pump 24 will move to a "closed" position for inhibiting fluid flow through its corresponding bleed port 90. This flow restriction causes an increase in pressure within piston chamber 52 which, in turn, causes piston 50 to exert a large engagement force on clutch pack 40 to actuate transfer clutch 22. A bleed by-pass slot 92 is formed in bleed ports 90 or control valves 86 and permits a small amount of bleed flow even when control valves 86 are in their closed position for gradually disengaging transfer clutch 22 when pump 20 is inactive.

As noted, hydraulic pump 20 is operable for pumping hydraulic fluid through first transfer ports 60 into piston chamber 52 to actuate transfer clutch 22 and for pumping fluid through second transfer ports 74 into clutch chamber 42 for cooling/lubricating clutch pack 40. Hydraulic pump 20 is bidirectional and is capable of pumping fluid at a rate proportional to speed differential between its pump components. In this regard, hydraulic pump 20 is shown to include a gerotor pump assembly 100 having a pump ring 104 that is fixed (i.e., keyed or splined) to shaft 12, an eccentric ring 106 that is fixed (i.e., splined) to piston housing 48 or case segment 24, and a stator ring 108 that is operably disposed therebetween. Pump ring 104 has a plurality of external teeth 110 that rotate concentrically relative to shaft 12 about a common rotational axis, as noted by axis line "X". Stator ring 108 includes a plurality of internal lobes 112 and has an outer circumferential edge surface 114 that is journally rotatably supported within a circular internal bore 115 formed in eccentric ring 106. Internal bore 115 is offset from the rotational axis "X" such that, due to meshing of internal lobes 112 of stator ring 108 with external teeth 110 of pump ring 104, relative rotation between pump ring 104 and eccentric ring 106 causes eccentric rotation of stator ring 108. This eccentric arrangement results in pumping action of fluid under pressure from pump inlet slots 116 formed in an end plate 102 of case segment 24 on the suction side of hydraulic pump 20 to the corresponding first and second shadow slots 62 and 76 located adjacent the discharge side of pump 20. Preferably, stator ring 108 has a number of lobes 112 that is one more than the number of teeth 110 provided on pump ring 104.

Gerotor pump assembly 100 is shown in FIG. 1 operably installed between piston housing 48 and end plate 102 of case segment 24. End plate 102 includes inlet ports 34 providing communication between sump 36 and first and second inlet slots 116A and 116B. When assembled, first inlet slots 116A are aligned with first shadow slots 62 and second inlet slots 116B are aligned with second shadow slots 76. A valving arrangement controls the delivery of fluid from sump 36 into inlet slots 116A and 116B. In particular, check valves 126 are mounted by rivets 128 within inlet slots 116A and 116B and which overlie each of inlets 34 for controlling flow therethrough. Check valves 126 are elongated metallic reed valve elements that are adapted to slide on rivets from a "closed" position to an "open" position in response to the pumping action of hydraulic pump 20 such that hydraulic fluid is drawn into a corresponding inlet port 34. Upon cessation of the pumping action, check valves 126 are adapted to return to their respective closed positions for maintaining a supply of fluid within inlet slots 116A and 116B. A discharge port 130 in casing 16 and a discharge port 132 in drum 28 permit fluid in clutch chamber 42 to communicate with sump 36.

Figure 5:
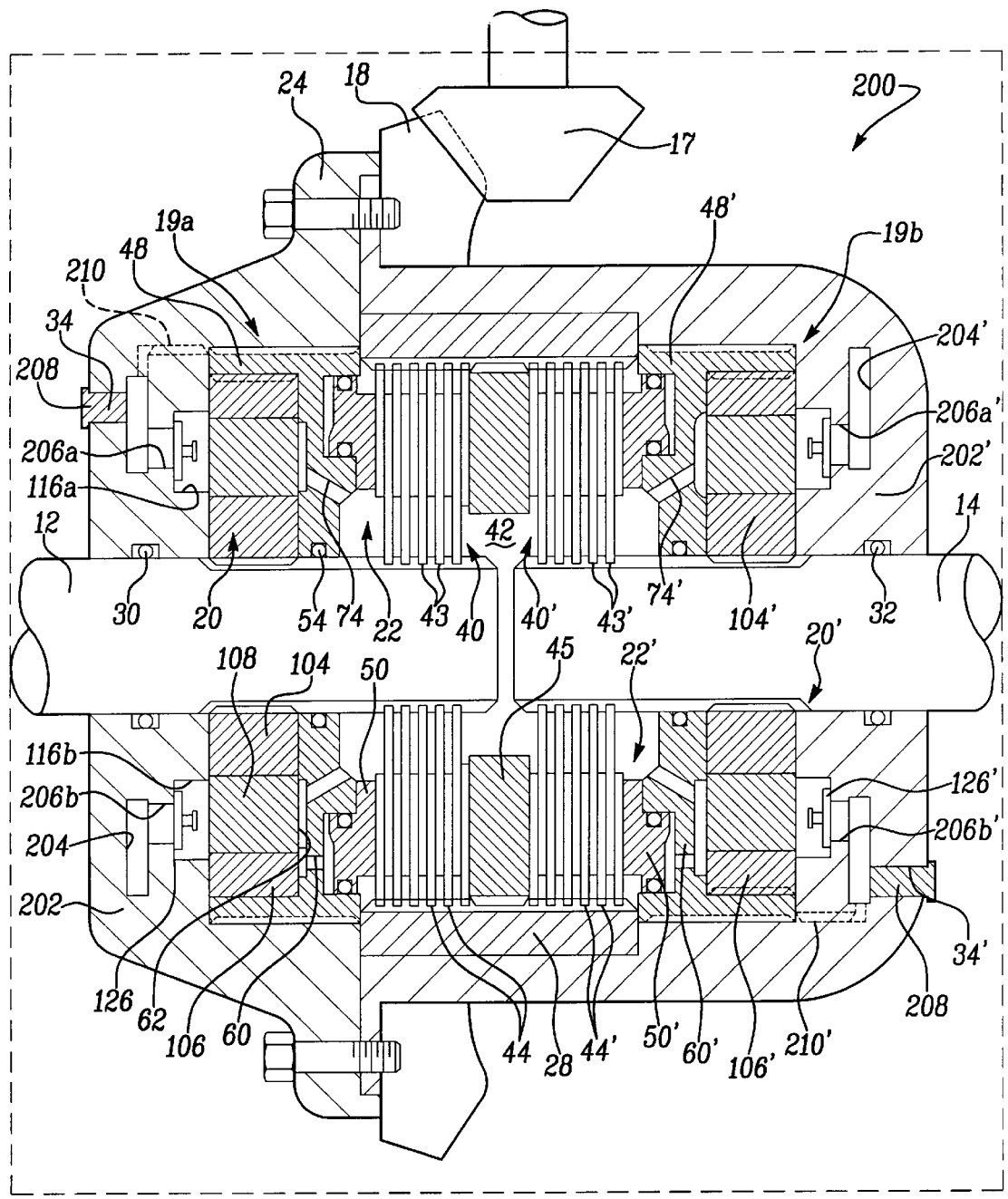
FIG. 5 illustrates an alternative construction for a sealed version of the differential assembly shown in FIG. 1.

Referring now to FIG. 5, a self-contained or "sealed" version of differential assembly 10 is shown and identified by reference numeral 200. In general, differential assembly 200 is substantially identical to differential assembly 10 with the exception that no fluid is drawn from outside of casing 16 and clutch chamber 42 acts as an internal sump. Since differential assembly 200 is a sealed unit, it finds particular application in vehicular driveline applications where no secondary lube pump is available and/or where a different type of hydraulic fluid is desired to be used within differential assembly 200 than that provided within sump 36 of driveline apparatus 11.

Since differential assembly 200 is comprised of a majority of components which are substantially identical to those shown and described in conjunction with differential assembly 10, similar components are identified by common reference numerals and the following description is primarily directed to those components that have been modified. In particular, end plate 202 of case segment 24 (and end plate 202' of case segment 26) is formed to include an annular supply chamber 204 and a series of first and second inlet ports 206a and 206b providing fluid communication between supply chamber 204 and corresponding pump inlet slots 116a and 116b. A plug 208 is removably mounted in inlet ports 34 to permit introduction of a desired quantity and type of hydraulic fluid into the internal chamber of differential assembly 200. Thereafter, plug 208 is installed in ports 34 for sealing differential assembly 200. Since differential assembly 200 is sealed, the operation thereof is generally identical to that described in reference to differential assembly 10 with the exception that the pumping action of hydraulic pump 20 causes hydraulic fluid in supply chamber 204 to be drawn into corresponding inlet ports 206. Check valves 126 are again mounted within pump inlet slots 116a and 116b and overlie inlet ports 206a and 206b for movement between open and closed positions for selectively controlling the flow of fluid therethrough. Upon cessation of the pumping action, check valves 126 are adapted to return to their respective closed position for maintaining a supply of fluid within inlet slots 116a and 116b.

Differential assembly 200 of the present invention further includes a recirculatory fluid path for returning fluid from clutch chamber 42 to supply chamber 204. This fluid path is defined in part by the removal of one or more external spline teeth on piston housing 48 to provide a flow channel from clutch chamber 42 which communicates with one or more return ports 210 formed in end plate 20. If required, one-way check valves (not shown) could be used to permit unidirectional flow of fluid into supply chamber 204 through return ports 210. Depending upon design the particular application, fluid in piston chamber 52 may be allowed to bleed back toward supply chamber 204 through aligned apertures (not shown) in piston housing 48, eccentric ring 106 and end plate 202.

Thus, the present invention is directed to providing both sealed and unsealed constructions for a differential assembly equipped with a pair of hydraulic couplings, each of which includes a transfer clutch, a hydraulic pump and a fluid distribution system for delivering fluid from the hydraulic pump to a first flow path to actuate the transfer clutch and a second flow path to cool the transfer clutch. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A differential assembly for a motor vehicle, the differential assembly comprising:
    a differential casing defining a clutch chamber;
    a first shaft rotatably supported from said casing;
    a second shaft rotatably supported from said casing;
    a hydraulic pump including a first member coupled for rotation with one of said first and second shafts and a second member coupled for rotation with said differential casing;
    a first hydraulic coupling rotatively coupling said differential casing to said first shaft; and
    a second hydraulic coupling rotatively coupling said differential casing to said second shaft;
    wherein said first and second hydraulic couplings each include a clutch pack disposed in said clutch chamber and having a first clutch plate fixed for rotation with one of said first and second shafts and a second clutch plate fixed for rotation with said differential casing, a piston housing fixed for rotation with said casing and defining a piston chamber, said piston housing further including a first transfer port providing fluid communication between said piston chamber and said hydraulic pump and a second transfer port providing fluid communication between said clutch chamber and said hydraulic pump, a piston disposed in said piston chamber for movement relative to said clutch pack for exerting a clutch engagement force thereon the magnitude of which is a function of fluid pressure in said piston chamber, said hydraulic pump operative for delivering fluid through said first transfer port to said piston chamber and through said second transfer port to said clutch chamber in response to speed differentiation between said first and second shafts and said differential casing.

2. The differential assembly of claim 1 wherein said clutch pack is disposed in said clutch chamber such that said first transfer port provides fluid communication between said piston chamber and a first slot located at a discharge side of said hydraulic pump and said second transfer port provides fluid communication between said clutch chamber and a second slot located at said discharge side of said hydraulic pump.

3. The differential assembly of claim 2 wherein said first and second slots are formed in said piston housing.

4. The differential assembly of claim 2 further comprising:
    a first check valve movable between an open position and a closed position relative to said first transfer port for permitting fluid to flow from said first slot into said piston chamber while preventing fluid flow from said piston chamber into said first slot; and
    a second check valve movable between an open position and a closed position relative to said second transfer port for permitting fluid to flow from said second slot into said clutch chamber while preventing fluid flow from said clutch chamber into said second slot.

5. The differential assembly of claim 1 wherein said differential casing includes inlet ports for permitting fluid to flow from an external sump to an internal reservoir at an inlet side of said hydraulic pump.

6. The differential assembly of claim 1 wherein said clutch chamber is sealed relative to said differential casing such that fluid in said clutch chamber is transferred through a flow passage to a supply chamber on an inlet side of said hydraulic pump.

7. The differential assembly of claim 6 wherein said flow passage includes a return port formed in said differential casing between said supply chamber and said piston housing, and a channel formed in said piston housing between said return port and said clutch chamber.

8. A differential assembly comprising:
    a differential casing defining a drum chamber;
    a first shaft rotatably supported by said casing and extending partially into said drum chamber;
    a first hydraulic coupling disposed in said drum chamber and including a first clutch pack operatively interconnected between said casing and said first shaft, a first housing defining a first pressure chamber, a first piston disposed in said first pressure chamber and actuatable to engage said clutch pack and rotatively couple said first shaft to said casing, a first pump providing a pumping action in response to relative rotation between said first shaft and said casing, a first flow path between a hydraulic fluid supply reservoir and said first pump, a second flow path between said first pump and said first pressure chamber, and a third flow path between said first pump and said first clutch pack;

a second shaft rotatably supported by said casing and extending particularly into said drum chamber; and a second hydraulic coupling disposed in said drum chamber and including a second clutch pack interconnected between said casing and said second shaft, a second housing defining a second pressure chamber, a second piston disposed in said second pressure chamber and actuatable to engage said second clutch pack and rotatively couple said second shaft to said casing, a second pump providing a pumping action in response to relative rotation between said second shaft and said casing, a fourth flow path between said hydraulic fluid supply reservoir and said second pump, a fifth flow path between said second pump and said second pressure chamber, and a sixth flow path between said second pump and said second clutch pack.

9. The differential assembly of claim 8 further comprising:

first check valves movable between an open position and a closed position relative to said first transfer ports; and second check valves movable between an open position and a closed position relative to said second transfer ports.

10. The differential assembly of claim 8 wherein said drum chamber is sealed and defines a clutch chamber in which said first and second clutch packs are located such that fluid in said clutch chamber is transferred through flow passages to supply chambers on an inlet side of said first and second pumps.

* * * * *

UNITED STATES PATENT AND TRADEMARK OFFICE
CERTIFICATE OF CORRECTION

PATENT NO : 6,095,939

DATED : August 1, 2000

INVENTOR(S) : Timothy M. Burns, Sankar K. Mohan

It is certified that error appears in the above-identified patent and that said Letters Patent are hereby corrected as shown below:

Column 10, line 6, claim 8, last line after "second clutch pack" insert --; and wherein said second flow path is a first transfer port formed through said first housing, said third flow path is a second transfer port formed through said first housing, said fifth flow path is a first transfer port formed through said second housing and said sixth flow path is a second transfer port formed through said second housing, said second transfer ports supplying fluid to cool said clutch packs--.

Signed and Sealed this

Twenty-ninth Day of May, 2001

*Attest:*

NICHOLAS P. GODICI

*Attesting Officer*      *Acting Director of the United States Patent and Trademark Office*